US007371454B2

(12) United States Patent
Tao et al.

(10) Patent No.: US 7,371,454 B2
(45) **Date of Patent: *May 13, 2008**

(54) IMAGEABLE ELEMENT COMPRISING SULFATED POLYMERS

(75) Inventors: Ting Tao, Fort Collins, CO (US); Scott A. Beckley, Windsor, CO (US); Shashikant Saraiya, Parlin, NJ (US)

(73) Assignee: Eastman Kodak Company, Rochester, NY (US)

(*) Notice: Subject to any disclaimer, the term of this patent is extended or adjusted under 35 U.S.C. 154(b) by 490 days.

This patent is subject to a terminal disclaimer.

(21) Appl. No.: 10/736,078

(22) Filed: Dec. 15, 2003

(65) Prior Publication Data

US 2005/0129915 A1 Jun. 16, 2005

(51) Int. Cl.

| | |
|---|---|
| ***B32B 27/14*** | (2006.01) |
| ***B32B 3/00*** | (2006.01) |
| ***G03C 1/492*** | (2006.01) |
| ***G03C 1/494*** | (2006.01) |
| ***G03C 1/76*** | (2006.01) |

(52) U.S. Cl. .............................. 428/195.1; 430/270.1; 430/302; 430/964

(58) Field of Classification Search ............ 428/195.1; 430/270.1, 302, 964

See application file for complete search history.

(56) References Cited

U.S. PATENT DOCUMENTS

| | | | | |
|---|---|---|---|---|
| 4,177,345 | A * | 12/1979 | Schweiger | 536/59 |
| 4,318,815 | A * | 3/1982 | Tyler | 507/213 |
| 5,372,907 | A | 12/1994 | Haley et al. | |
| 5,589,322 | A * | 12/1996 | Lobo et al. | 430/449 |
| 5,677,110 | A | 10/1997 | Chia et al. | |
| 5,750,656 | A * | 5/1998 | Myers | 528/373 |
| 5,919,601 | A | 7/1999 | Nguyen et al. | |
| 5,965,319 | A | 10/1999 | Kobayashi | |
| 6,090,532 | A | 7/2000 | West et al. | |
| 6,280,899 | B1 | 8/2001 | Parsons et al. | |
| 6,413,694 | B1 | 7/2002 | Zheng et al. | |
| 6,423,469 | B1 | 7/2002 | DoMinh et al. | |
| 6,448,435 | B1 * | 9/2002 | Jacobson et al. | 562/39 |
| 6,465,152 | B1 | 10/2002 | DoMinh et al. | |
| 6,790,590 | B2 * | 9/2004 | Collins et al. | 430/270.1 |
| 6,939,663 | B2 * | 9/2005 | Tao et al. | 430/270.1 |
| 7,049,047 | B2 * | 5/2006 | Tenaglia et al. | 430/273.1 |
| 2002/0068240 | A1 | 6/2002 | Teng | |
| 2002/0136961 | A1 | 9/2002 | McCullough et al. | |
| 2003/0064318 | A1 | 4/2003 | Huang et al. | |
| 2005/0008965 | A1 * | 1/2005 | Tao et al. | 430/270.1 |

FOREIGN PATENT DOCUMENTS

| | | |
|---|---|---|
| EP | 1072402 A2 | 1/2001 |
| EP | 1093015 A1 | 4/2001 |
| EP | 1110719 A2 | 6/2001 |
| EP | 0931647 B1 | 4/2003 |
| WO | WO 00/17711 | 3/2000 |
| WO | WO 01/39985 A2 | 6/2001 |
| WO | WO 02/21215 A1 | 3/2002 |

OTHER PUBLICATIONS

Kice et al, The Mechanism of the Acid Hydrolysis of Sodium Aryl Sulfates, Journal of the American Chemical Society, vol. 88, Nov. 20, 1966, pp. 5242-5245.

Burstein et al, Kinetics and Mechanism of Solvolysis of Steroid Hydrogen Sulfates, Journal of the American Chemical Society, vol. 80, Oct. 5, 1958, pp. 5235-5239.

* cited by examiner

*Primary Examiner*—Betelhem Shewareged
(74) *Attorney, Agent, or Firm*—J. Lanny Tucker

(57) ABSTRACT

Sulfated polymers, imageable elements containing these polymers, and methods for preparing images useful as lithographic printing plates from these imageable elements are disclosed. The sulfate groups are attached either to aryl groups that are pendent to the polymer backbone, and/or to alkyl groups that are either pendant to the polymer backbone and/or part of the polymer backbone. The elements can be thermally imaged and developed in water or in fountain solution so that an alkaline developer is not required. They can be imaged and developed on press using fountain solution so that it is unnecessary to mount them in a separate exposure device.

11 Claims, No Drawings

IMAGEABLE ELEMENT COMPRISING SULFATED POLYMERS

FIELD OF THE INVENTION

The invention relates to sulfated polymers. In particular, this invention relates to sulfated polymers and their use in lithographic printing plate precursors.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive working. Conversely, if the unimaged regions are removed, the precursor is negative working. In each instance, the regions of the imageable layer (i.e., the image areas) that remain are ink-receptive, and the regions of the hydrophilic surface revealed by the developing process accept water and aqueous solutions, typically a fountain solution, and repel ink.

Conventional imaging of the imageable element with ultraviolet and/or visible radiation was carried out through a mask, which has clear and opaque regions. Imaging takes place in the regions under the clear regions of the mask but does not occur in the regions under the opaque regions. However, direct digital imaging, which obviates the need for imaging through a mask, is becoming increasingly important in the printing industry. Imageable elements for the preparation of lithographic printing plates have been developed for use with infrared lasers. Thermally imageable, elements are disclosed, for example, in Shimazu, U.S. Pat. Nos. 6,294,311, 6,352,812, and 6,593,055; Patel, U.S. Pat. No. 6,352,811; Savariar-Hauck, U.S. Pat. Nos. 6,358,669, 6,528,228; West, U.S. Pat. No. 6,090,532; Parsons, U.S. Pat. No. 6,280,899; McCullough, U.S. Pat. Pub. No. 2002/0136961; and WO99/21715; Haley, U.S. Pat. No. 5,372,907; Nguyen, U.S. Pat. No. 5,919,601; Kobayashi, U.S. Pat. No. 5,965,319; Busman, U.S. Pat. No. 5,763,134; and WO 00/17711.

Imaged imageable elements typically require processing in a developer to convert them to lithographic printing plates. Developers are typically aqueous alkaline solutions, which may also contain substantial amounts of organic solvents. Because of their high pH and the presence of organic solvents, disposal of substantial quantities of developer is expensive and can cause environmental problems. Processing of the imaged imageable element in a developer also introduces additional costs in, for example, the cost of the developer, the cost of the processing equipment, and the cost of operating the process.

On-press developable lithographic printing plate precursors can be directly mounted on a press after imaging and developed with ink and/or by fountain solution during the initial press operation. These precursors do not require a separate development step before mounting on press. On press imaging, in which the precursor is both imaged and developed on press, eliminates mounting the precursor in a separate imaging device. Thus, a need exists for imageable elements useful as lithographic printing plate precursors that can be developed in water and/or in fountain solution. Preferably, development can be carried out on press to avoid a separate development step.

SUMMARY OF THE INVENTION

The invention is an imageable element useful as a printing plate precursor. The element comprises an imageable layer over a substrate; in which:

the imageable layer comprises:

a photothermal conversion material, and a sulfated polymer comprising sulfate groups and a polymer backbone; and the sulfate groups are attached to aryl groups that are pendent to the polymer backbone, to alkyl groups, or both to aryl groups that are pendent to the polymer backbone and to alkyl groups.

The imageable elements do not require development in a conventional developer that has a high pH and/or contains an organic solvent. They can be developed with water or on-press using fountain solution and/or ink as the developer.

DETAILED DESCRIPTION OF THE INVENTION

Unless the context indicates otherwise, in the specification and claims, the terms sulfated polymer, infrared absorber, photothermal conversion material, surfactant, coating solvent, and similar terms also include mixtures of such materials. Thermal imaging refers to imaging with a hot body, such as a thermal head, or with infrared radiation. Unless otherwise specified, all percentages are percentages by weight.

Imageable Elements

Sulfated Polymers

The imageable elements comprise an imageable layer, which comprises a sulfated polymer and a photothermal conversion material. Sulfation refers to the process of introducing sulfate ester groups into a polymer or into a monomer that will be converted to a polymer. Typically, sulfation involves conversion a hydroxyl group to a sulfate group, such as by methods discussed below. Sulfate group refers to the sulfate ester group, which may be in acid form ($—OSO_3H$) and/or in salt form ($—OSO_3^-X^+$). Sulfated polymer and sulfated resin refers to a polymer that contains sulfate groups, typically one in which the hydroxyl groups for at least some of the repeating units of the polymer have been converted to sulfate groups (sulfate ester groups).

The sulfate groups that are attached either to aryl groups (i.e., sulfated phenolic hydroxyl groups) or to alkyl groups (i.e., sulfated aliphatic hydroxyl groups). If the sulfate groups are attached to alkyl groups (for example, aliphatic hydroxyl groups that are converted to sulfate groups), the alkyl groups may be either part of the main chain of the polymer (polymer backbone) or pendent to the main chain of the polymer. If the sulfate groups are attached to aryl groups (for example, phenolic groups are converted to sulfate groups), the aryl groups are pendent to the main chain (polymer backbone) of the polymer. The units of the polymer that comprise the sulfate groups can be randomly interspersed among the repeating units of the polymer, or can be distributed in a more orderly fashion, such as in a segmented polymer or a block copolymer.

The sulfate groups may be in the acid form ($—OSO_3H$), in the salt form with a counterion $X^+$ ($—OSO_3^-X^+$), or both. Useful counterions ($X^+$) include sodium; potassium; ammonium; substituted ammonium, preferably containing one to sixteen carbon atoms, such as methyl ammonium, dimethyl ammonium, trimethyl ammonium, tetramethyl ammonium, ethyl ammonium, diethyl ammonium, triethyl ammonium, tetraethyl ammonium, methyldiethyl ammonium, dimethylethyl ammonium, 2-hydroxyethyl ammonium, di-(2-hydroxyethyl) ammonium, tri-(2-hydroxyethyl) ammonium, 2-hydroxyethyl-dimethyl ammonium; n-propyl ammonium, di-(n-propyl) ammonium, tri-(n-propyl) ammonium, tri-(n-propyl) methyl ammonium, tetra-(n-propyl) ammonium, tetra-(n-butyl) ammonium, and tetra-(iso-butyl) ammonium; pyridinium; iodonium; sulfonium; and diazonium.

The sulfated polymer may be prepared by sulfation of a precursor polymer. The precursor polymer has hydroxyl groups that can be converted to sulfate groups. It can be prepared by homopolymerization of a monomer having either a hydroxyl group or a group, such as acetate, that can be converted to a hydroxyl group after polymerization, or by copolymerization of such a monomer with other monomers. Examples of such monomers include:

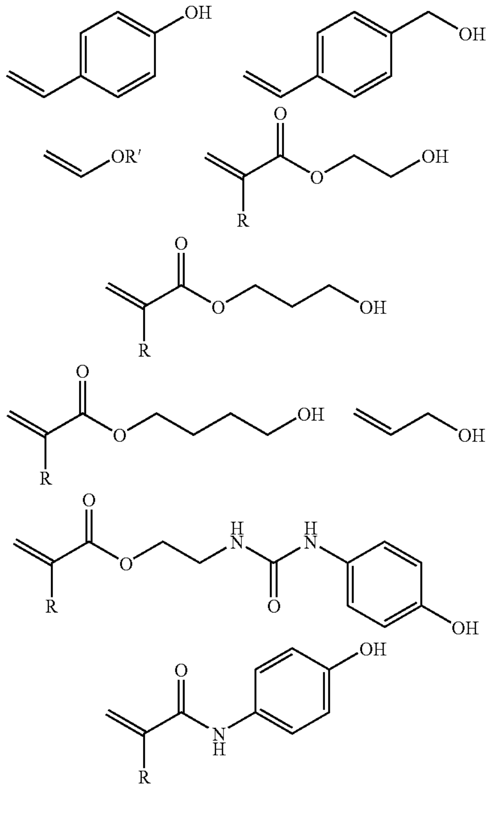

in which R is hydrogen or an alkyl group, typically methyl; and R' is a COR group, i.e., OR' is an ester group, typically acetate.

When the precursor polymer is prepared by copolymerizing the precursor monomer with one or more other polymerizable monomers, any other polymerizable monomer or monomers may be used to form the copolymer, provided the resulting sulfated polymer is still operative in the invention. Typical other polymerizable monomers include, for example, acrylic acid; acrylic acid esters such as methyl acrylate, ethyl acrylate, propyl acrylate, and butyl acrylate; methacrylic acid; methacrylic acid esters such as methyl methacrylate, ethyl methacrylate, propyl methacrylate, and butyl methacrylate; methacrylamides and acrylamides, such as methacrylamide, acrylamide, and the acrylamide and methacrylamide of p-aminobenzoic acid; methacrylonitrile; acrylonitrile; maleic acid; maleic anhydride; maleate esters; maleic acid amides; maleic acid imides, such as N-phenylmaleimide, N-cyclohexylmaleimide, and N-benzylmaleimide; itaconic acid; itaconic anhydride; itaconic acid esters; itaconic acid amides; itaconic acid imides, crotonic acid, crotonic anhydride, crotonic acid esters, crotonic acid amides; crotonic acid imides, fumaric acid, fumaric acid esters, fumaric acid amides, alpha, beta-unsaturated lactones, alpha, beta-unsaturated lactams, alpha, beta-unsaturated hydrocarbons; vinyl esters, such as vinyl acetate; alpha, beta-unsaturated ketones, such as methyl vinyl ketone; and styrene and substituted styrenes.

When a vinyl ester, such as vinyl acetate, is used, the ester groups in the resulting polymer or copolymer may be converted to hydroxyl groups by hydrolysis. The resulting hydroxyl groups will be attached to the main chain of the polymer rather than to pendent groups. Preferably, when the precursor polymer is a copolymer, at least 30 mol % of recurring units that comprise the polymer comprise a hydroxyl group that may be converted to a sulfate group or a group, such as acetate, that can be converted to a hydroxyl that can be converted to a sulfate group. In the sulfated polymer, at least 30 mol % of recurring units that comprise the polymer comprise either the hydroxyl group or the sulfate group.

The precursor polymers can be prepared by methods, such as free radical polymerization, which are well known to those skilled in the art and which are described, for example, in Chapters 20 and 21, of *Macromolecules*, Vol. 2, 2nd Ed., H. G. Elias, Plenum, N.Y., 1984. Useful free radical initiators are peroxides such as benzoyl peroxide, hydroperoxides such as cumyl hydroperoxide and azo compounds such as 2,2'-azobisisobutyronitrile (AIBN). Suitable solvents include liquids that are inert to the reactants and which will not otherwise adversely affect the reaction. Typical solvents include, for example, esters such as ethyl acetate and butyl acetate; ketones such as methyl ethyl ketone, methyl isobutyl ketone, methyl propyl ketone, and acetone; alcohols such as methanol, ethanol, isopropyl alcohol, and butanol; ethers such as dioxane and tetrahydrofuran, and mixtures thereof.

Methods for sulfating organic compounds are described, for example, in Jacobson, U.S. Pat. No. 6,448,435, and in *Sulfation and Sulfation Processes*, N. C. Foster (The Chemithon Corporation, 1997). Methods for sulfating hydroxyl-containing polymers are described in Schweiger, U.S. Pat. No. 4,177,345; Tyler, U.S. Pat. No. 4,318,815; and Myers, U.S. Pat. No. 5,750,656.

The sulfated polymer may be prepared by, for example, reaction of a hydroxyl containing polymer resin with a sulfating agent in an organic solvent to convert hydroxyl groups to sulfate groups. Typical sulfating agents include, for example, sulfur trioxide ($SO_3$); chlorosulfonic acid ($ClSO_3H$); sulfamic acid ($H_2NSO_3H$); the sulfur trioxide-pyridine complex; sulfur trioxide trialkylamine complexes, such as the sulfur trioxide-trimethylamine complex and the sulfur trioxide-triethylamine complex; sulfur trioxide/triarylamine complexes; and the sulfur trioxide/N,N-dimethylformamide complex.

In the reaction of a sulfating agent with a polymer to yield a sulfated polymer, the reaction may be controlled so that fewer than all the hydroxy groups of the polymer are sulfated. One particularly useful way of controlling the number of hydroxy groups that are replaced is limit the amount of sulfating agent used in the reaction.

Other conventional methods may be suitable for preparing the sulfated polymer. For example, a sulfated polymer may be prepared by homopolymerization or by copolymerization using a sulfated monomer, using for example, the methods described above, or by sulfating a polymer that comprises protecting groups at some sites normally occupied by hydroxy groups.

Degree of sulfation, a measure of the number of repeating units that comprise sulfate groups, is defined as the ratio of the number of units in the polymer that comprise sulfate groups to the total number of units in the polymer that comprise hydroxyl groups. For example, a degree of sulfation of 0.25 indicates that 25% of the hydroxyl groups of the polymer are sulfated, that is, at least 25% of the total number of hydroxyl groups and sulfate groups in the polymer are sulfate groups.

Typically, the degree of sulfation is 0.25 or greater, preferably about 0.3 or greater, and more preferably about 0.5 or greater, that is, at least 50% of the total number of hydroxyl groups and sulfate groups in the polymer are sulfate groups. Sulfated polymers in salt form (i.e., comprising predominantly $—SO_3^- X^+$ groups) may be more suitable than sulfated polymers in acid form (i.e., comprising predominantly $—OSO_3H$ groups), for use in the imageable elements.

Photothermal Conversion Material

The imageable layer comprises an infrared absorber, known as a photothermal conversion material. Photothermal conversion materials absorb radiation and convert it to heat. Although a photothermal conversion material is not necessary for imaging with a hot body, imageable elements that contain a photothermal conversion material may also be imaged with a hot body, such as a thermal head or an array of thermal heads.

The photothermal conversion material may be any material that can absorb radiation and convert it to heat. Suitable materials include, for example, dyes and pigments. Suitable pigments include, for example, carbon black, Heliogen Green, Nigrosine Base, iron (III) oxide, manganese oxide, Prussian Blue, and Paris blue. Because of its low cost and wide absorption bands that allow it to be used with imaging devices having a wide range of peak emission wavelengths, one useful pigment is carbon black. The size of the pigment particles should not be more than the thickness of the layer that contains the pigment. Preferably, the size of the particles will be half the thickness of the layer or less.

The photothermal conversion material may be a dye with the appropriate absorption spectrum. Dyes, especially dyes with a high extinction coefficient in the range of 750 nm to 1200 nm, are preferred. Examples of suitable dyes include dyes of the following classes: methine, polymethine, cyanine, arylmethine, hemicyanine, streptocyanine, squarylium, pyrylium, oxonol, naphthoquinone, anthraquinone, porphyrin, azo, croconium, triarylamine, thiazolium, indolium, oxazolium, indocyanine, indotricarbocyanine, oxatricarbocyanine, phthalocyanine, thiocyanine, thiatricarbocyanine, merocyanine, cryptocyanine, naphthalocyanine, polyaniline, polythiophene, chalcogenopyryloarylidene and bis(chalcogenopyrylo)polymethine, polypyrrole, oxyindolizine, pyrazoline azo, and oxazine classes. Absorbing dyes are disclosed in numerous publications, for example, Nagasaka, EP 0,823,327; DeBoer, U.S. Pat. No. 4,973,572; Jandrue, U.S. Pat. No. 5,244,771; and Chapman, U.S. Pat. No. 5,401,618. Examples of useful absorbing dyes include: ADS-830A and ADS-1064 (American Dye Source, Montreal, Canada), EC2117 (FEW, Wolfen, Germany), Cyasorb IR 99 and Cyasorb IR 165 (Glendale Protective Technology), Epolite IV-62B and Epolite III-178 (Epoline), PINA-780 (Allied Signal), SpectraIR 830A and SpectraIR 840A (Spectra Colors), and IR Dye A, whose structure is shown below:

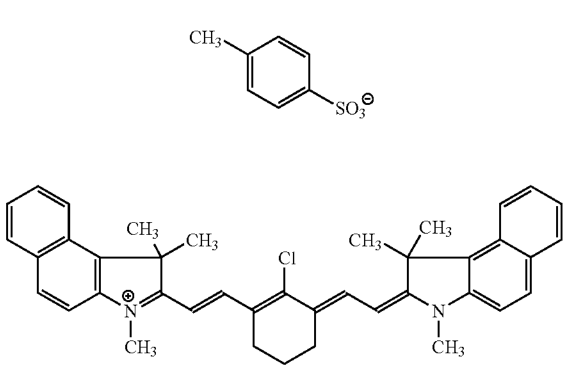

IR Dye A

When the imageable element is to be developed with water or fountain solution, infrared absorbing compounds that are soluble in water are preferred. Water soluble N-alkyl sulfate infrared absorbing cyanine compounds of Structure I may be used in the imageable layer.

I

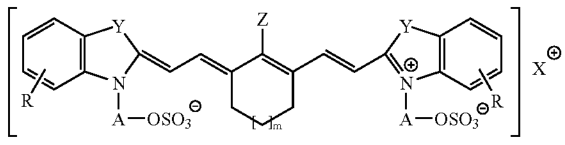

in which:

R is hydrogen, or R is one or more alkyl, substituted or unsubstituted aralkyl, alkoxy, carboxyl, nitro, cyano, trifluoromethyl, acyl, alkyl sulfonyl, aryl sulfonyl, or halogen groups, or R is the atoms necessary to form a substituted or unsubstituted benzo group;

A is $(CH_2)_n$; where n is 1-5; preferably 2-4;

Y is O, S, NR', or $C(R')_2$, where R' is hydrogen or alkyl; preferably methyl;

Z is hydrogen, halogen, alkyl, substituted or unsubstituted aralkyl; substituted or unsubstituted aroxyl, substituted or unsubstituted thioaroxyl, or substituted or unsubstituted diphenylamino;

m is zero or one; and

X is a cation, preferably sodium, potassium, lithium, ammonium, or substituted ammonium.

Y is preferably S or $C(CH_3)_2$.

The preparation of these infrared absorbing compounds described in co-filed application KPG-5093, incorporated herein by reference. The triethyl ammonium salts, for example, may be prepared by following procedure:

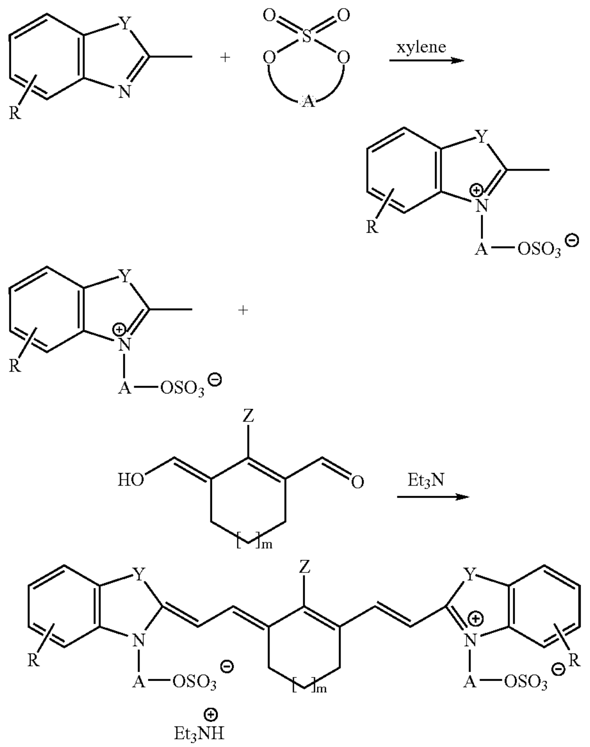

The amount of infrared absorber is generally sufficient to provide an optical density of at least 0.05, and preferably, an optical density of from about 0.5 to at least about 2 to 3 at the imaging wavelength in the imageable layer. As is well known to those skilled in the art, the amount of compound required to produce a particular optical density can be determined from the thickness of the layer in which it is present and the extinction coefficient of the infrared absorber at the wavelength used for imaging using Beer's law. The photothermal conversion material typically comprises about 0.1 to 25% by weight of the imageable layer, based on the total weight of the imageable layer. When the photothermal conversion material is a pigment, it preferably comprises about 10% to about 20% by weight, of the imageable layer. When the photothermal conversion material is a dye, the infrared absorber typically comprises about 2% to about 15% by weight of the imageable layer.

Other Ingredients

The imageable layer may also comprise other ingredients such as dyes and surfactants that are conventional ingredients of imageable compositions and imageable layers. Surfactants may be present in the imageable layer, as, for example, coating aids. A dye may be present to aid in the visual inspection of the imaged and/or developed element. Printout dyes distinguish the imaged regions from the unimaged regions during processing. Contrast dyes distinguish the unimaged regions from the imaged regions in the developed imageable element. Preferably, these dyes do not absorb the imaging radiation. Other conventional ingredients include, for example, dispersing agents, biocides, plasticizers, viscosity modifiers or rheology modifiers, defoamers, preservatives, antioxidants, and combinations thereof. Additional binders, for example water soluble binders such as polyvinyl pyrrolidone may also be present.

Substrate

The substrate comprises a support, which may be any material conventionally used to prepare imageable elements useful as lithographic printing plates. The support is preferably strong, stable and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a cylinder in a printing press, typically about 100 μm to about 600 μm. Typically, the substrate comprises an interlayer between the aluminum support and the imageable layer. The interlayer may be formed by treatment of the aluminum support with, for example, silicate, dextrine, hexafluorosilicic acid, phosphate/fluoride, polyvinyl phosphonic acid (PVPA), vinyl phosphonic acid copolymers, or a water-soluble diazo resin.

The backside of the support (i.e., the side opposite the imageable layer) may be coated with an antistatic agent and/or a slipping layer or matte layer to improve handling and "feel" of the imageable element.

Preparation of the Imageable Elements

The imageable element may be prepared by applying the imageable layer over the hydrophilic surface of the substrate using conventional techniques. The imageable layer may be applied by any conventional method, such as coating or lamination. Typically the ingredients of the imageable layer are dispersed or dissolved in a suitable coating solvent, such as water or a mixture of water and an organic solvent such as methanol, ethanol, iso-propyl alcohol, and/or acetone, and the resulting mixture coated by conventional methods, such as spin coating, bar coating, gravure coating, die coating, slot coating, or roller coating. After coating, the layer is dried to remove the coating solvent. The resulting element may be air dried at ambient temperature or at an elevated temperature, such as at about 65° C. for about 20 seconds in an oven. Alternatively, the resulting imageable element may be dried by blowing warm air over the element. The coating weight for the imageable layer is typically about 0.5 $g/m^2$ to about 2.5 $g/m^2$, preferably about 1 $g/m^2$ to about 1.5 $g/m^2$.

Imaging and Processing of the Imageable Elements

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers, the GS618-400 thermal plotter (Oyo Instruments, Houston, Tex., USA), or the Model VP-3500 thermal printer (Seikosha America, Mahwah, N.J., USA).

Imaging produces an imaged element, which comprises a latent image of imaged regions and complementary unimaged regions. Development of the imaged element to form a printing plate, or printing form, converts the latent image to an image by removing the imaged regions, revealing the hydrophilic surface of the underlying substrate. The imaged element is washed with an aqueous liquid, such as water or fountain solution, either on press or in a conventional rinse/gum apparatus. This process removes the imaged regions, but does not remove the complementary unimaged regions.

The imaged imageable element may be developed in water. Although distilled or deionized water may be used, the imaged element typically can be developed in tap water. Although development with tap water will typically be carried out in a separate processor, rather than on press, it is not necessary to prepare and dispose of expensive, high pH developers when water is used. In addition, only a simple processor is necessary so expensive processors are not required to develop the imaged imageable element in water.

Alternatively, the imaged imageable element can be directly mounted on press after imaging and developed with fountain solution during the initial prints. No separate development step is needed before mounting on press. This eliminates the separate development step along with both the processor and developer, thus simplifying the printing process and reducing the amount of expensive equipment required. The imaged imageable element is mounted on the plate cylinder of a lithographic press and developed with fountain solution by rotating the press cylinders and contacting the element with fountain solution.

Numerous aqueous fountain solutions are known to those skilled in the art. Fountain solutions are disclosed, for example, in Matsumoto, U.S. Pat. No. 5,720,800; Archer, U.S. Pat. No. 5,523,194; Chase, U.S. Pat. No. 5,279,648; Bondurant, U.S. Pat. Nos. 5,268,025, 5,336,302, and 5,382,298; Egberg, U.S. Pat. No. 4,865,646; and Daugherty, U.S. Pat. No. 4,604,952. Typical ingredients of aqueous fountain solutions, in addition to water, typically deionized water, include pH buffering systems, such as phosphate and citrate buffers; desensitizing agents, such as dextrin, gum arabic, and sodium carboxymethylcellulose; surfactants and wetting agents, such as aryl and alkyl sulfonates, polyethylene oxides, polypropylene oxides, and polyethylene oxide derivatives of alcohols and phenols; humectants, such as glycerin and sorbitol; low boiling solvents such as ethanol and 2-propanol; sequestrants, such as borax, sodium hexametaphosphate, and salts of ethylenediamine tetraacetic acid; biocides, such as isothiazolinone derivatives; and antifoaming agents. Typical pH ranges for fountain solutions are: about 3.7 to about 6.7 for sheet fed presses, and about 7.0 to about 9.6 for web presses.

In conventional wet press lithographic printing, fountain solution and then ink are applied to the printing plate. For presses with integrated inking/dampening system, the ink and fountain solution are emulsified by various press rollers before being transferred to the plate as emulsion of ink and fountain solution. However, in this invention, the ink and fountain solution may be applied in any combination or sequence, as needed for the plate.

For on-press imaging, the imageable element is imaged while mounted on a lithographic printing press cylinder, and the imaged imageable element is developed on press with fountain solution during the initial press operation. This is especially suitable for computer-to-press application in which the imageable element (or elements, for multiple color presses) is directly imaged on the plate cylinder according to computer generated digital imaging information and, with minimum or no treatment, directly prints out regular printed sheets. On-press imaging may be carried out on, for example, a Quickmaster DI 46-4 press (Heidelberger Druckmaschinen, Heidelberg, Germany).

INDUSTRIAL APPLICABILITY

The imageable elements of the invention can be developed with water or on-press using fountain solution as the developer thus avoiding the costs associated with the use of aqueous alkaline developers. Once the imageable element has been imaged and developed to form a lithographic printing plate, printing can then be carried out by applying a fountain solution and then lithographic ink to the image on its surface. The fountain solution is taken up by the unimaged regions, i.e., the surface of the hydrophilic substrate revealed by the imaging and development process, and the ink is taken up by the imaged regions, i.e., the regions not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

In the Examples, "coating solution" refers to the mixture of solvent or solvents and additives coated, even though some of the additives may be in suspension rather than in solution, and "total solids" refers to the total amount of nonvolatile material in the coating solution even though some of the additives may be nonvolatile liquids at ambient temperature. Except where indicated, the indicated percentages are percentages by weight based on the total solids in the coating solution.

Glossary

DMF N,N-dimethylformamide

Intermediate A 2-chloro-1-formyl-3-hydroxymethylenecyclohexene

Intermediate B 2,3,3-trimethyl-(3-sulfapropyl)indolenium, inner salt

IR Dye A 2-[2-[2-chloro-3-[[1,3-dihydro-1,1-dimethyl-3-(3-sulfopropyl)-2H-benz[e]indol-2-ylidene]ethylidene]-1-cyclohexen-1-yl]ethenyl]-1,1-dimethyl-3-(3-sulfopropyl)-1H-benz[e]indolium inner salt (Eastman Kodak, Rochester, N.Y., USA)

IR Dye B 2-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with N,N-diethyl-1-ethylamine (1:1)

IR Dye $C_2$-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with sodium (1:1)

LODYNE® S-103A Alkyl sodium sulfonate fluorosurfactant (Ciba Specialty Chemical, High Point, N.C., USA)

m-TMI 3-Isopropenyl-alpha, alpha-dimethylbenzyl isocyanate

PP-1 Poly(4-hydroxystryene), MW=23,000 (Hoechst)

PP-2 60:40 Poly(styrene-co-allyl alcohol), MW=2,200 (Aldrich, Milwaukee, Wis., USA)

PP-3 Copolymer, see structure below (Kokusan Chemical, Tokyo, Japan)

PP-4 Copolymer, see structure below (Kodak Polychrome Graphics, Gumna, Japan)

PP-9 Poly(2-hydroxyethyl methacrylate), MW=300,000 (Scientific Polymer Products, Ontario, N.Y., USA)

PP-10 Poly(2-hydroxypropyl methacrylate), MW=300,000 (Scientific Polymer Products, Ontario, N.Y., USA)

Pyridine—Sulfating agent (Aldrich, Milwaukee, Wis., USA) $SO_3$ complex

Substrate A 0.3 mm thick aluminum sheet which had been electrograined, anodized and treated with a solution of polyvinylphosphoric acid VAZO®-64 Azobisisobutyronitrile (DuPont, Wilmington, Del., USA)

PP-3

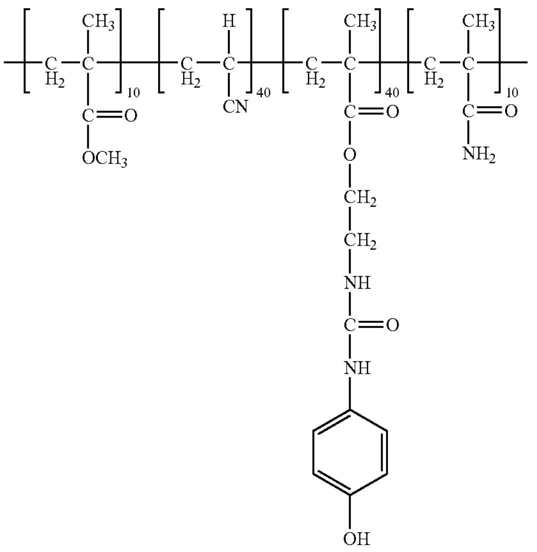

-continued

PP-4

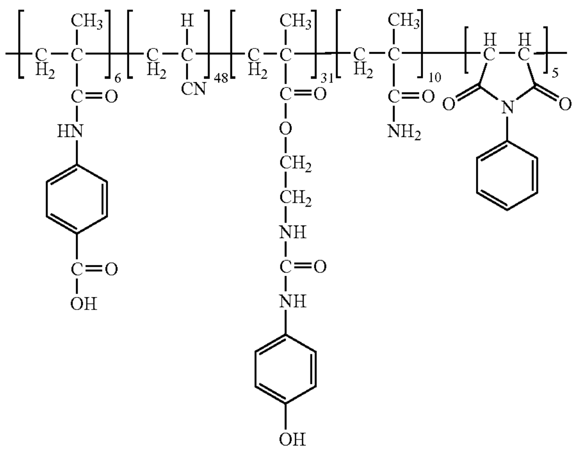

General Procedures for the Synthesis of Sulfated Polymers

1. Synthesis of Sulfated Polymers that Contain the Ammonium Ion

This example describes a general procedure for the synthesis of sulfated polymers that contain the ammonium ion (Sulfated polymers 1A, 2A, 3A, 4A, 5A, 6A, 7A, 8A, 9A and 10A).

5.0-10.0 g of precursor polymer, 2.0-8.0 g of pyridine-$SO_3$ complex, and 25-100 g of pyridine was added to a 250 ml flask equipped with magnetic stirring bar, and the reaction mixture stirred at room temperature for 18 hours. The solvent was decanted from the reaction mixture, and the viscous residue was stirred with 2-10 ml of 30% aqueous ammonium hydroxide for 30 minutes. The polymer was precipitated in 600-1,000 ml of 2-propanol, tetrahydrofuran, acetone, or diethylether and filtered off. The resulting polymer was dissolved in 20-100 g of water, and the solution stored for further use.

2. Synthesis of Sulfated Polymers that Contain the Pyridinium Ion

This example describes a general procedure for the synthesis of sulfated polymers that contain the pyridinium ion (Sulfated polymers 3B, 4B, 5B and 8B).

5.0-10.0 g of precursor polymer, 2.0-8.0 g of pyridine-$SO_3$ complex, and 25-100 g of pyridine was added to a 250 ml flask equipped with magnetic stirring bar, and the reaction mixture stirred at room temperature for 18 hours. The solvent was decanted from the reaction mixture, and the viscous residue was precipitated in 600-1,000 ml of 2-propanol, tetrahydrofuran, acetone, or diethylether and filtered off. The resulting polymer was dissolved in 20-100 g of water or water/alcohol, and the solution stored for further use.

3. Synthesis of Sulfated Polymers that Contain the Tetramethylammonium Ion

This example describes a general procedure for the synthesis of sulfated polymers that contain the tetramethylammonium ion (e.g., 3C, 4C, and 5C).

In a 250 ml flask equipped with magnetic stirring bar, 5.0-10.0 g of precursor polymer, 2.0-8.0 g of pyridine-$SO_3$ complex (Aldrich, Milwaukee, Wis., USA), and 25-100 g of pyridine was added, and the mixture was stirred at room temperature for 18 hours. The solvent was decanted from the reaction mixture, and the product stirred with 2-10 ml of 25% tetramethylammonium hydroxide for 30 minutes. The reaction mixture was then precipitated in 600-1,000 ml of 2-propanol or tetrahydrofuran, and the resulting polymer was then dissolved in 20-100 g of water (or water/alcohol) for further use.

Alternatively, sulfamic acid may be used as the sulfating agent for these polymers.

4. Synthesis of Sulfated Polymers that Contain the Sodium Ion

This example describes a general procedure the synthesis of sulfated polymers that contain the sodium ion (e.g., 6B and 7B).

In a 250 ml flask equipped with magnetic stirring bar, 5.0-10.0 g of precursor polymer, 2.0-8.0 g of pyridine-$SO_3$ complex), and 25-100 g of pyridine was added, and the mixture was stirred at room temperature for 18 hours. After decant solvent the polymer was stirred with 10-20 ml of 10% sodium hydroxide for 30 min. The reaction mixture was then precipitated in 600-1,000 ml of isopropyl alcohol or tetrahydrofuran, and the resulting polymer was then dissolved in 20-100 g of water (or water/alcohol) for further use.

Example 1

This example illustrates the synthesis of precursor polymer 5 (PP-5).

PP-5

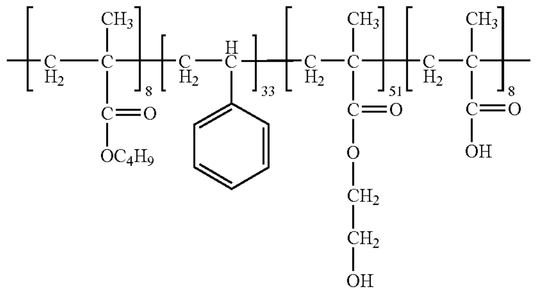

600 g of 2-methoxyethanol, 49.9 g of hydroxyethylmethacrylate, 32.8 g of styrene, 7.5 g of butylmethacrylate, 7.7 g of methacrylic acid, 1.96 g of VAZO®-64, and 0.245 g of dodecylmercaptan were charged in to four necked 2 L flask equipped with a heating mantle, temperature controller, mechanical stirrer, condenser, nitrogen inlet and dropping funnel. The reaction mixture was heated to 80° C. under nitrogen. A mixture of 149.6 g of hydroxyethylmethacrylate, 98.3 g of styrene, 22.4 g of butylmethacrylate, 23.0 g of methacrylicacid, 3.90 g of VAZO®-64, and 0.73 g of dodecylmercaptan was added over a period of 2 hours, followed by additional 0.98 g of VAZO®64. After the reaction mixture was heated at 80° C. for an additional 2 h, an additional 0.98 g of VAZO®-64 was added. The reaction mixture was heated for an additional 4 h and allowed to cool to room temperature. Polymer conversion was >98%. The viscosity was 550 cps at 40% n on-volatiles. The acid number was 50.0.

The polymer was precipitated in water/ice mixture by using air driven mixer at 4000 rpm. The produce was filtered off and dried at about 49° C. (120° F.) over night in an oven.

Example 2

This example illustrates the synthesis of precursor polymer 6 (PP-6).

PP-6

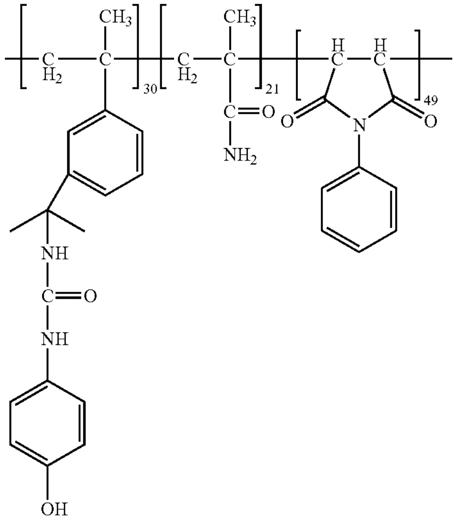

Synthesis of Monomer 1: 50.23 g of M-TMI was charged in to four necked 500 ml flask, equipped with a heating mantle, temperature controller, mechanical stirrer, condenser, and nitrogen inlet. The reaction mixture was heated to 30° C. under a nitrogen atmosphere. Then a mixture of 234.2 g of dimethylacetamide and 27.82 g of p-aminophenol was added at 30° C. Two hours later the temperature was raised slowly to 40° C. The progress of the reaction was monitored by disappearance of the NCO absorption at 2275 $cm^{-1}$.

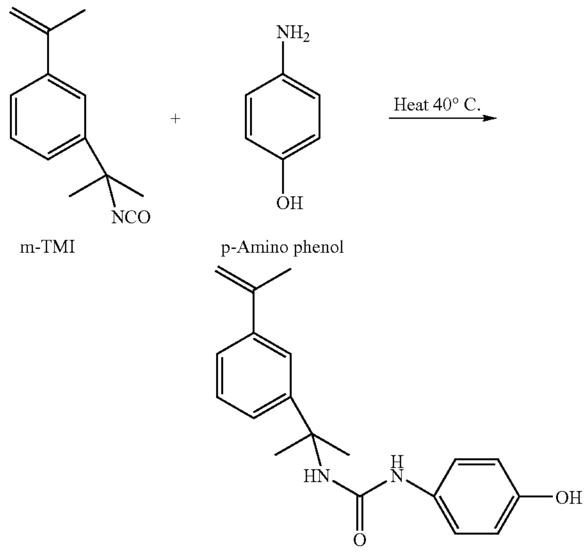

m-TMI
p-Amino phenol

Synthesis of precursor polymer 6: 210.0 g of Dimethylacetamide, 120 g of Monomer 1 (25% non-volatiles), 48.87 g of N-phenylmaleimide, and 21.0 g of methacrylamide were charged in to four necked 500 ml flask. The reaction mixture was heated at 60° C. Nitrogen was passed through the reaction mixture for one hour after which a nitrogen atmosphere was maintained over the reaction mixture during the rest of the reaction. 0.135 g of VAZO®-64 was added, and the reaction mixture was maintained at 58 to 60° C. for 22 hours. The conversion to polymer at this stage was approximately 94% based on percent nonvolatiles. An additional 0.3 g of VAZO®-64 was added and temperature was raised to 80° C. The polymer conversion was remained the same after several hours. The viscosity was 50 cps at 25% non-volatile.

The polymer was precipitated in water/ice mixture by using air driven mixer at 4000 rpm. The produce was filtered off and dried at about 49° C. (120° F.) overnight in an oven.

Example 3

This example illustrates the synthesis of precursor polymer 7 (PP-7).

PP-7

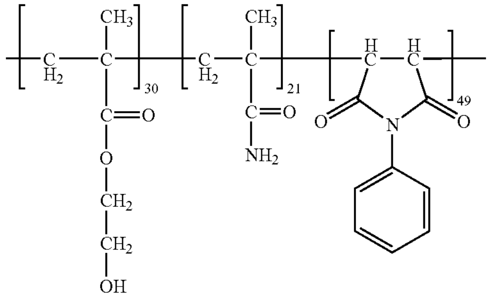

300.0 g of Dimethylacetamide, 30.0 g of hydroxyethyl methacrylate, 48.87 g of N-phenylmaleimide, and 21.0 g of methacrylamide were charged in to four necked 1 L flask equipped with a heating mantle, temperature controller, mechanical stirrer, condenser, and nitrogen inlet. The reaction mixture was heated at 60° C. Nitrogen was passed through the reaction mixture for one hour after which a nitrogen atmosphere was maintained over the reaction mixture during the rest of the reaction. 0.135 g of VAZO®-64 was added, and the reaction mixture was maintained at 58 to 60° C. for 22 hours. The conversion to polymer at this stage was approximately 80% based on percent nonvolatiles. An additional 0.3 g of VAZO® 64 was added and temperature was raised to 80° C. for an additional two hours. The polymer conversion was >98% and viscosity was 275 cps at 25% non-volatile.

The polymer was precipitated in water/ice mixture by using air driven mixer at 4000 rpm. The produce was filtered off and dried at about 49° C. (120° F.) overnight in an oven.

Example 4

This example illustrates the synthesis of precursor polymer 8 (PP-8).

PP-8

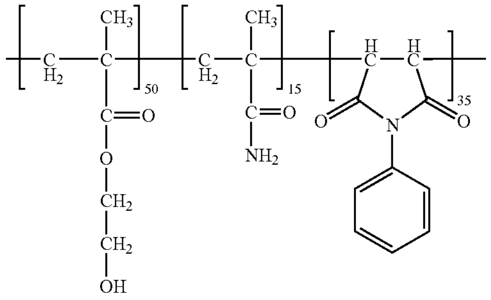

The procedure of Example 3 was repeated, except that 50.0 g of hydroxyethyl methacrylate, 35.0 g of N-phenylmaleimide and 15.0 g of methacrylamide were used.

Example 5

This example illustrates preparation of 2-chloro-1-formyl-3-hydroxymethylenecyclohexene (Intermediate A).

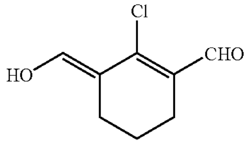

80 ml of DMF was placed in a 500 ml round bottom flask equipped with a magnetic stirrer, a nitrogen gas inlet, a condenser, a thermometer and a pressure-equalizing additional funnel. The flask was cooled in an ice-water bath and 74 ml of phosphorous oxychloride was slowly added to the DMF while the reaction temperature was maintained between 10 and 15° C. for one hour. Upon the completion of the addition, the reaction mixture was allowed to warm to room temperature for 30 minutes. A mixture of 20 g of cyclohexanone and 100 ml of DMF was slowly added o the flask the reaction temperature was maintained between 40 and 50° C. The mixture was heated at 55° C. for 3 hours in a water bath, and was then slowly poured into a mixture of 600 g of ice and 400 g of water. After the reaction mixture was stirred for about 15 h, the precipitate was filtered and washed with water until a neutral filtrate was obtained. The resulting yellow solid was collected and dried at ambient temperature in dark overnight. The yield was 26 g.

Example 6

Preparation of 2,3,3-trimethyl-(3-sulfapropyl)indolenium, inner salt (Intermediate B).

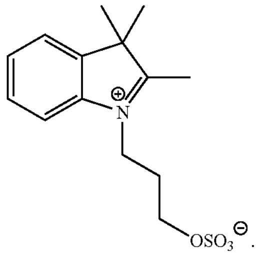

16 g of 2,3,3-trimethylindolenine (TCI America) was mixed with 15 g of 1,3-propanediol cyclic sulfate (Aldrich) in 200-ml of toluene in a 500-ml flask equipped with condenser and stirring bar. The mixture was heated at 100° C. in an oil bath for 14 hours. After the reaction mixture was cooled to room temperature, the toluene was decanted, and the orange solid residual was stirred with 500-ml of acetone for 3 h. The suspension was filtered and washed with 3×30 ml of acetone. The product was dried in ambient temperature. Yield: 16.6 g.

Proton NMR (in DMSO-$d_6$): δ1.53 (6H, s), 2.20 (2H, pentet), 2.85 (3H, s), 3.88 (2H, t), 4.56 (2H, t) and 7.50-8.00 (4H, m).

Example 7

Synthesis of 2-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with N,N-diethyl-1-ethylamine (1:1) [Dye B]

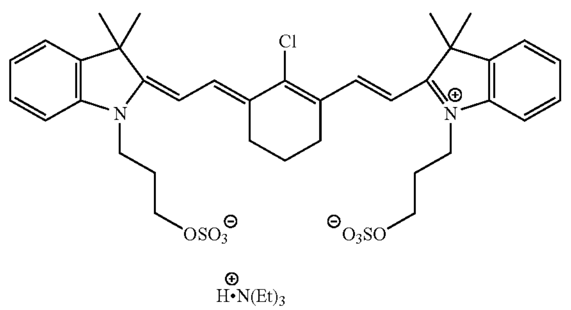

0.3 g of triethylamine and 0.2 g of acetic anhydride were dissolved in 5 g of DMF. 0.59 g of intermediate B and 0.18 g of intermediate A were added to the DMF solution. The mixture was stirred at room temperature for 1 h and the color turned into dark green. Another portion of 0.3 g of triethylamine and 0.2 g of acetic anhydride was added and the reaction mixture was stirred overnight. After the reaction mixture was cooled to 0-5° C. in a water-ice bath, the resulting precipitate was filtered off, washed with 30 ml of ethyl acetate, and dried in a vacuum. Yield: 0.40 g.

Proton NMR (in DMSO-$d_6$): δ 1.16 (9H, t), 1.68 (12H, s), 1.83 (2H, m), 2.02 (4H, m), 2.74 (4H, m), 3.10 (6H, m), 3.87 (4H, t), 4.26 (4H, t), 6.41 (2H, d) 7.2-7.8 (8H, m), 8.26 (2H, d) and 8.85 (1H, br).

Example 8

Synthesis of 2-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with sodium (1:1) [Dye C]

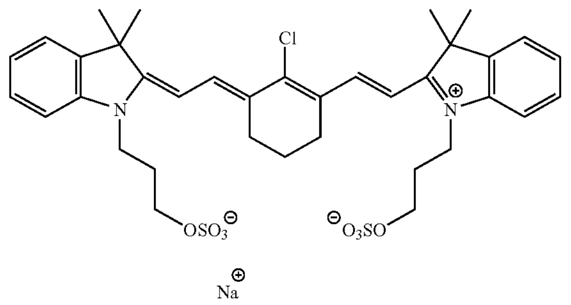

2.0 g of dye formed in Example 3 was stirred with 20-ml water, 30 ml methanol and 1 g of sodium acetate for 1 h. The solid was filtered off, washed with 10 ml of water followed by 10 ml of methanol, and dried at room temperature overnight. Yield: 1.8 g.

Proton NMR (in DMSO-$d_6$): δ 1.69 (12H, s), 1.84 (2H, m), 2.03 (4H, m), 2.75 (4H, m), 3.89 (4H, t), 4.27 (4H, t), 6.42 (2H, d), 7.2-7.8 (8H, m) and 8.28 (2H, d).

Example 9

This Example illustrates evaluation of the sulfated polymers in imageable elements. The following the general procedures for the preparation of sulfated polymers, the following sulfated polymers were prepared.

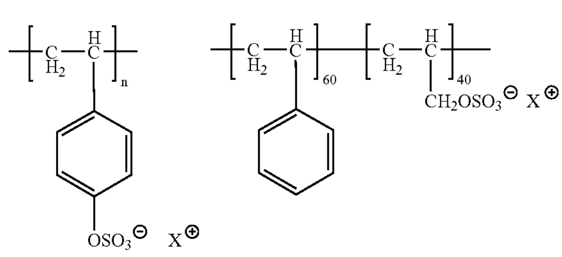

1A: $X^{\oplus} = NH_4^{\oplus}$

2A: $X^{\oplus} = NH_4^{\oplus}$

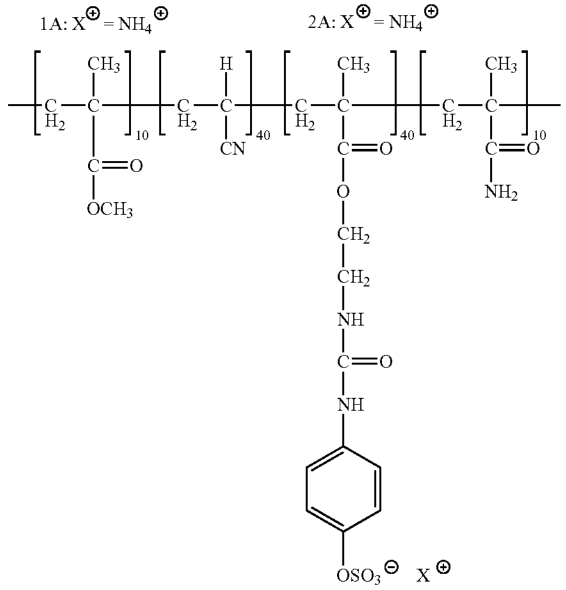

3A: $X^{\oplus} = NH_4^{\oplus}$

3B: $X^{\oplus}$ = Pyridinium

3C: $X^{\oplus}$ = Tetramethyl ammonium

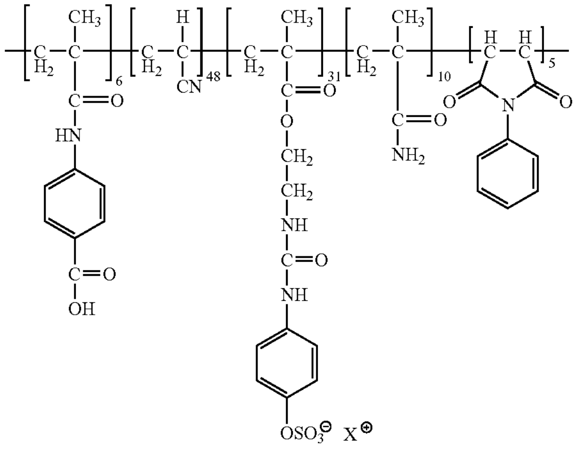

4A: $X^{\oplus} = NH_4^{\oplus}$

4B: $X^{\oplus}$ = Pyridinium

4C: $X^{\oplus}$ = Tetramethyl ammonium

-continued

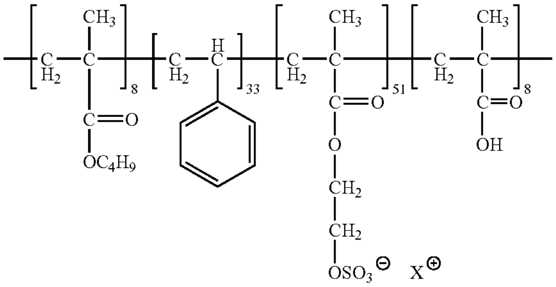

5A: X$^{\oplus}$ = $NH_4^{\oplus}$
5B: X$^{\oplus}$ = Pyridinium
5C: X$^{\oplus}$ = Tetramethyl ammonium

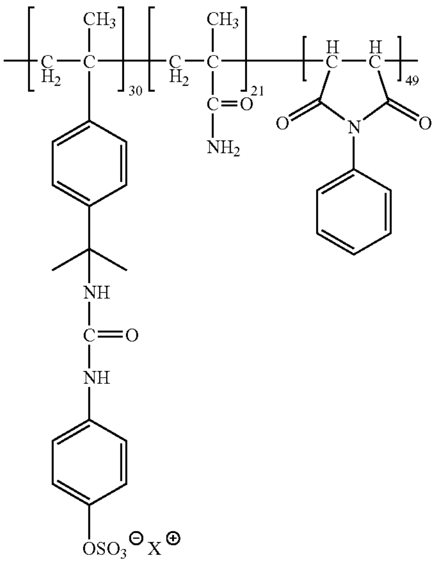

6A: X$^{\oplus}$ = $NH_4^{\oplus}$
6B: X$^{\oplus}$ = $Na^{\oplus}$

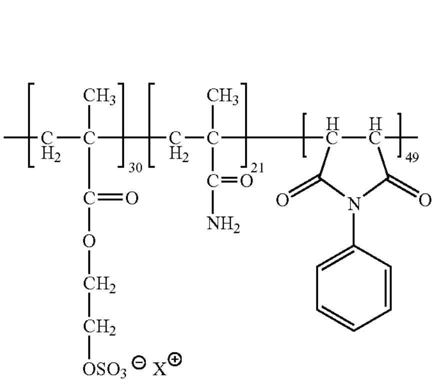

7A: X$^{\oplus}$ = $NH_4^{\oplus}$
7B: X$^{\oplus}$ = Sodium

-continued

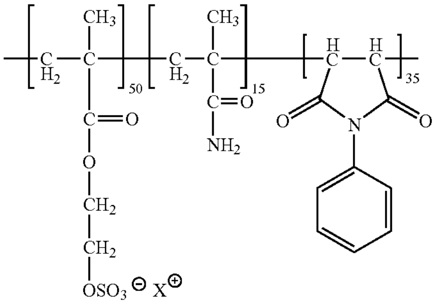

8A: X$^{\oplus}$ = $NH_4^{\oplus}$
8B: X$^{\oplus}$ = Pyridinium

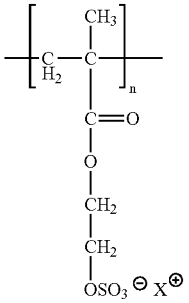

9A: X$^{\oplus}$ = $NH_4^{\oplus}$

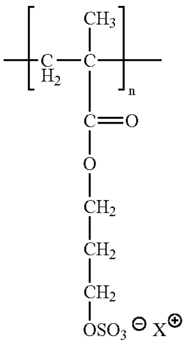

10A: X$^{\oplus}$ = $NH_4^{\oplus}$

The coating solutions for the imageable layers were prepared as shown in Table 1. In addition to the ingredients listed, sample contained a trace (<0.01%) of LODYNE® S-103A. With the exception of 9-3, 9-4, 9-5, and 9-8, each coating solution was coated onto an electrochemically grained, anodized and post-treated with polyvinylphosphoric acid (PVPA) aluminum substrate using a wire wound bar. The resulting imageable element, consisting of the imageable layer on the substrate, was dried in a Ranar conveyor oven at about 76° C. for about one minute. 9-3, 9-4, 9-5, and 9-8 were each coated from a sample coater, a slot coating device, and the resulting imageable element dried on a rotating drum. The dry coating weight of the imageable layers was between 0.5-2.0 g/m$^2$.

Each of the imageable elements was placed on a CREO® Trendsetter 3244x image setter (CreoScitex, Burnaby, British Columbia, Canada), and imaged with a 830 nm laser at a power of 12 W and a range of drum speeds from 210 to 50 rpm (imaging energies of 130 to 550 mJ/cm$^2$). Each imaged imageable element was developed in tap water or fountain solutions to remove the non-imaged regions.

TABLE 1

| Example | Polymer (%) | IR Dye (%) | Solvent (%) | Coating Wt. ($g/m^2$) | Exposure energy ($mJ/cm^2$) |
|---|---|---|---|---|---|
| 9-1 | 1A (3.0%) | A (1.0%) | Water (96%) | 0.8 | 200 |
| 9-2 | 2A (4.1%) | C (0.4%) | Water (95.5%) | 1.1 | 550 |
| 9-3 | 3A (7.7%) | A (0.5%) | Water (91.8%) | 1.9 | 160 |
| 9-4 | 3B (7.7%) | A (0.5%) | Water (91.8%) | 1.9 | 160 |
| 9-5 | 3C (6.0%) | A (0.3%) | Water 93.7 | 1.5 | 300 |
| 9-6 | 3C (6.0%) | B (0.5%) | Water (93.5%) | 1.6 | 160 |
| 9-7 | 4A (6.0%) | A (0.5%) | Water 93.5 | 1.6 | 160 |
| 9-8 | 4A (5.9%) | A (0.4%) | Water (93.7%) | 1.5 | 160 |
| 9-9 | 4B (4.2%) | B (0.3%) | Water (95.5) | 1.1 | 160 |
| 9-10 | 4C (6.0%) | B (0.5%) | Water (93.5%) | 1.6 | 160 |
| 9-11 | 5A (6.0%) | A (0.5%) | Water (93.5%) | 1.6 | 200 |
| 9-12 | 5B (4.2%) | C (0.4%) | Water (75.5%)/2-propanol (20.0%) | 1.1 | 200 |
| 9-13 | 5B (4.2%) | B (0.3%) | Water (95.5%) | 1.1 | 200 |
| 9-14 | 5B (9.0%) | A (0.6%) | Water (90.4%) | 2.3 | 300 |
| 9-15 | 5C (6.0%) | A (0.5%) | Water (93.5%) | 1.6 | 200 |
| 9-16 | 6A (4.5%) | B (0.4%) | Water (45.1%)/-acetone (50%) | 1.2 | 550 |
| 9-17 | 7B (3.5%) | B (0.4%) | Water (96.1%) | 0.8 | No image |
| 9-18 | 8A (3.3%) | A (0.3%) | Water (75.2%)/methanol (15.7%)/butyrolactone (5.5%) | 0.8 | 550 |
| 9-19 | 9A (6.0%) | A (0.5%) | Water (93.5%) | 1.5 | 550 |
| 9-20 | 10A (3.0%) | A (1.5%) | Water (95.5%) | 1.1 | 550 |

The minimum exposure energies to achieve good images varied from 160 to 550 $mJ/cm^2$ for Examples 9-1 to 9-16. No images were observed for Examples 9-2 and 9-17. Very weak images were formed in Examples 9-2, 9-18, 9-19 and 9-20, but the imaged regions would not accept ink.

Having described the invention, we now claim the following and their equivalents.

What is claimed is:

1. A lithographic printing plate precursor comprising an imageable layer over a lithographic substrate having a hydrophilic surface; in which: the imageable layer comprises:

a photothermal conversion material, and a sulfated polymer comprising sulfate groups and a polymer backbone wherein said sulfate groups are attached to aryl groups that are pendent to the polymer backbone, to alkyl groups, or both to aryl groups that are pendent to the polymer backbone and to alkyl groups.

2. The imageable element of claim 1 in which the sulfate groups are attached to aryl groups that are pendent to the polymer backbone.

3. The imageable element of claim 1 in which the sulfate groups are attached to alkyl groups.

4. The imageable element of claim 1 in which the sulfated polymer comprises hydroxyl groups and the sulfate groups, and at least 50% of the sum of the hydroxyl groups and the sulfate groups are sulfate groups.

5. The imageable element of claim 4 in which at least 30 mol % of recurring units that comprise the polymer comprise either the hydroxyl group or the sulfate group.

6. The imageable element of claim 5 in which the sulfate groups are attached to aryl groups that are pendent to the polymer backbone.

7. The imageable element of claim 5 in which the sulfate groups are attached to alkyl groups.

8. The imageable element of claim 5 in which the sulfated polymer is a co-polymer of methyl methacrylate, acrylonitrile, methacrylamide, and $CH_2{=}C(CH_3)—CO_2—(CH_2)_2—NH—CO—NH\text{-}p\text{-}C_6H_4—OH$.

9. The imageable element of claim 5 in which the sulfated polymer is a co-polymer of acrylonitrile, methacrylamide, N-phenylmaleimide, $CH_2{=}C(CH_3)—CO—NH\text{-}p\text{-}C_6H_4—CO_2H$, and $CH_2{=}C(CH_3)—CO_2—(CH_2)_2—NH—CO—NH\text{-}p\text{-}C_6H_4—OH$.

10. The imageable element of claim 5 in which the sulfated polymer is a co-polymer of butyl methacrylate, styrene, hydroxyethyl methacrylate, and methacrylic acid.

11. The lithographic printing plate precursor of claim 1 wherein said lithographic substrate is an aluminum-containing substrate.

* * * * *